(12) United States Patent
Malawer et al.

(10) Patent No.: US 6,620,900 B2
(45) Date of Patent: Sep. 16, 2003

(54) PROLIFEROUS COPOLYMER OF VINYL PYRROLIDONE AND VINYL ACETATE

(75) Inventors: Edward G. Malawer, Wayne, NJ (US); James P. Cullen, Bartonsville, PA (US); Chi-San Wu, Wayne, NJ (US); Laurence Senak, Livingston, NJ (US); William J. Drefko, Kearny, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/071,753

(22) Filed: Feb. 7, 2002

(65) Prior Publication Data

US 2003/0153705 A1 Aug. 14, 2003

(51) Int. Cl.[7] ................................. C08F 26/08
(52) U.S. Cl. ................ 526/264; 526/330; 424/464
(58) Field of Search ..................... 526/264, 330; 424/464

(56) References Cited

U.S. PATENT DOCUMENTS

| | | | | | |
|---|---|---|---|---|---|
| 4,658,002 | A | * | 4/1987 | Tschang et al. | 526/264 |
| 5,091,184 | A | * | 2/1992 | Khanna | 424/435 |
| 5,393,825 | A | * | 2/1995 | Tseng et al. | 524/548 |
| 5,567,786 | A | * | 10/1996 | Tseng et al. | 526/264 |
| 5,594,013 | A | * | 1/1997 | Trigger | 514/356 |
| 5,599,898 | A | * | 2/1997 | Hartmann et al. | 28/310 |
| 5,663,258 | A | * | 9/1997 | Zhong et al. | 526/264 |
| 6,171,583 | B1 | * | 1/2001 | Breitenbach et al. | 424/78.25 |
| 6,524,617 | B1 | * | 2/2003 | Moroni et al. | 424/465 |
| 2002/0128293 | A1 | * | 9/2002 | Rampal et al. | 514/338 |
| 2003/0008006 | A1 | * | 1/2003 | Puthli et al. | 424/473 |

* cited by examiner

Primary Examiner—Helen L. Pezzuto
(74) Attorney, Agent, or Firm—Walter Katz; William J. Davis; Marilyn J. Maue

(57) ABSTRACT

What is described herein is a pharmaceutical excipient which is a proliferous copolymer of vinyl pyrrolidone and vinyl acetate, having advantageous dissolution and disintegration properties.

8 Claims, 2 Drawing Sheets

Cumulative % Drug Released in Aqueous Solution for Tablets Containing Proliferous VP/VA Copolymer, Polyplasdone XL and Control

PROLIFEROUS COPOLYMER OF VINYL PYRROLIDONE AND VINYL ACETATE

BACKGROUND OF THE INVENTION

1. Field of the Invention

This invention relates to pharmaceutical excipients, and, more particularly, to a proliferous copolymer of vinyl pyrrolidone and vinyl acetate having advantageous dissolution and disintegration properties.

2. Description of the Prior Art

Zhong, Y. et al, in U.S. Pat. No. 5,663,258, described a strongly swellable, moderately crosslinked copolymer of vinyl pyrrolidone and vinyl acetate made by precipitation polymerization in the presence of a free radical initiator. The copolymer obtained by this process had unique gel volume and viscosity properties which enabled it to thicken aqueous and non-aqueous solutions effectively.

Meffert, H., in EP 0979649A2, also described copolymers of vinyl pyrrolidone and vinyl acetate made by free radical polymerization, optionally with an added crosslinking agent, which process provided copolymers having K-value of 50 to 200. Such copolymers were considered suitable for use as a matrix material in pharmaceutical or cosmetic preparations.

Blankenburg, R. et al, in U.S. Pat. No. 5,635,169, also described a free radical process for making copolymers of vinyl pyrrolidone and vinyl acetate having a K-value of 30–50 for use in cosmetic formulations.

Tseng, S. et al, in U.S. Pat. No. 5,393,854, described the preparation of the isomeric compound 1-vinyl-3(E)-ethylidene pyrrolidone (EVP) having the formula:

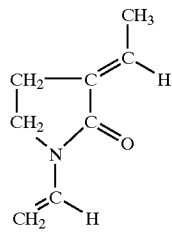

which, in solid form, had a purity of at least 95% and were white, needle-shaped crystals having a melting point of 59–61° C. This isomeric compound was used as a crosslinking agent in the proliferous polymerization of vinyl pyrrolidone.

Tseng, S. et al in U.S. Pat. No. 5,393,854, also described a polymerizable composition of vinyl pyrrolidone and isomeric EVP for proliferous polymerization of vinyl pyrrolidone.

Accordingly, it is an object of the present invention to provide a proliferous copolymer of vinyl pyrrolidone and vinyl acetate for use as efficient excipient for drugs, and which has advantageous dissolution and disintegration properties at predetermined pH levels. No free radical initiators are employed in the present invention.

SUMMARY OF THE INVENTION

What is described herein are pharmaceutical excipients which are proliferous copolymers of vinyl pyrrolidone (VP) and vinyl acetate (VA) having more advantageous dissolution and disintegration properties than proliferous polyvinylpyrrolidone itself, or of soluble or swellable copolymers of vinyl pyrrolidone and vinyl acetate, made by a free radical process. The invention also includes a process for making such proliferous copolymers, and excipient tablets of a drug and such copolymers. In particular, the proliferous copolymers of vinyl pyrrolidone and vinyl acetate of the invention exhibit slower dissolution and disintegration properties under aqueous acidic conditions (which is attributed to their increased hydrophobicity) as compared to polyvinylpyrrolidone homopolymer.

Specifically, a proliferous copolymer of the invention, consists essentially of, by weight, about 60–85% VP, about 1540% VA, and about 1–5% of a crosslinker.

The proliferous polymerization process for making the proliferous copolymer of the invention comprises providing a polymerization mixture of, by weight, 60–85% VP, 15–40% VA, and about 1–5% crosslinker, at a temperature of about 100° C., heating until proliferous polymerization occurs, and then recovering the desired copolymer.

IN THE DRAWINGS

DETAILED DESCRIPTION OF THE INVENTION

In accordance with the invention, there is provided herein a proliferous copolymer of vinyl pyrrolidone and vinyl acetate which is an effective and advantageous excipient for drugs, and which is capable of effecting a predetermined dissolution and disintegration of drug tablets at various pH levels.

The proliferous copolymer of vinyl pyrrolidone and vinyl acetate of the invention generally comprises about 60–85 wt. % of vinyl pyrrolidone and about 15–40 wt. % of vinyl acetate, and about 1–5 wt. % of a crosslinker, preferably about 75–82 wt. % of VP and 18–25 wt. % VA, and about 1.5–2.5 wt. % of a crosslinker.

The Tg of the copolymer is about 114–172° C.

Suitable crosslinkers include ethylidene-vinyl pyrrolidone (EVP), divinyl imidazolidone (DVI), N,N-methylene-bisacrylamide and allyl methacrylate. EVP is preferred. The crosslinker must be added to the polymerization mixture.

In a typical run, the monomers of VP and VA, in predetermined amounts, and crosslinker, in amount of 1–5% by wt. of the monomers and water, are held in a sealed tube at about 100° C. until the reaction mixture pops, i.e. proliferous polymerization occurs, whereupon crystals appear. The contents then are left for an additional hour, cooled and discharged. Then water is added and the reaction product, i.e. the crosslinked copolymer, is filtered, and thereafter it is dried in a vacuum oven at 70° C.

Typical reaction mixtures for preparing the proliferous copolymer of the invention are given in Table 1 below.

TABLE 1

| Ex. | % VP | % VA | Crosslinker | % Crosslinker* |
|---|---|---|---|---|
| 1 | 82.1 | 15.9 | EVP | 2.0 |
| 2 | 82.1 | 15.9 | DVI | 2.0 |
| 3 | 81.9 | 15.9 | N,N-methylene-bis- | 2.2 |

TABLE 1-continued

| Ex. | % VP | % VA | Crosslinker | % Crosslinker* |
|-----|------|------|-------------|----------------|
|     |      |      | acrylamide  |                |
| 4   | 82.1 | 16.0 | Allyl Methacrylate | 1.9 |
| 5   | 81.8 | 16.0 | N,N-methylene-bis-acrylamide | 2.2 |
| 6   | 82.2 | 15.9 | Allyl Methacrylate | 1.9 |
| 7   | 82.0 | 16.2 | Allyl Methacrylate | 1.8 |
| 8   | 73.6 | 24.5 | Allyl Methacrylate | 1.9 |
| 9   | 64.7 | 33.4 | Allyl Methacrylate | 1.9 |
| 10  | 73.6 | 24.5 | Allyl Methacrylate | 1.9 |
| 11  | 64.7 | 33.3 | Allyl Methacrylate | 2.0 |
| 12  | 73.7 | 24.4 | Allyl Methacrylate | 1.9 |

*Based on monomer physically added wt/wt.

Figure 1:
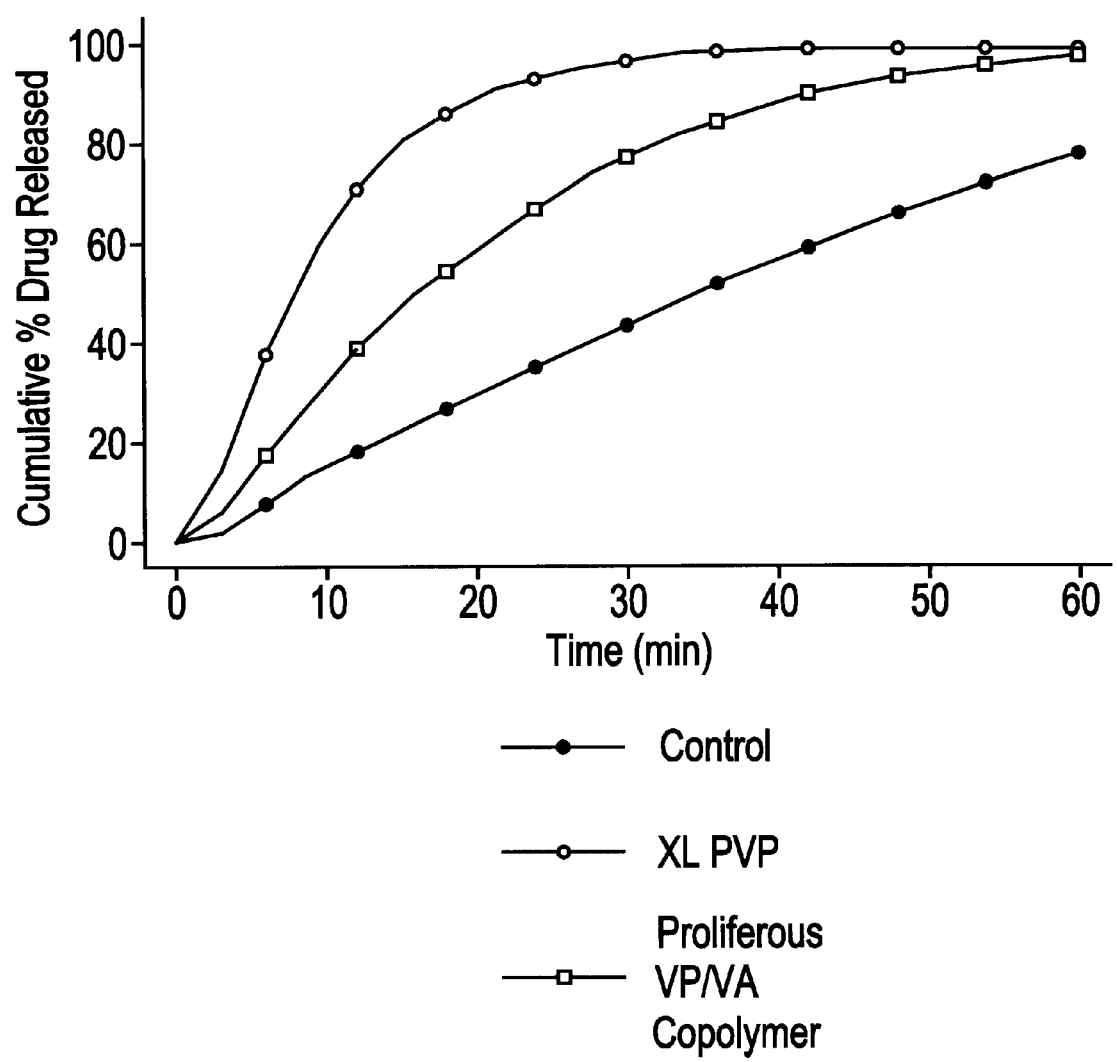
FIG. 1 is a graph of Cumulative % Drug Release vs. Time for a proliferous copolymer of VP/VA of the invention compared to Crosslinked PVP and a Control.
Figure 2:
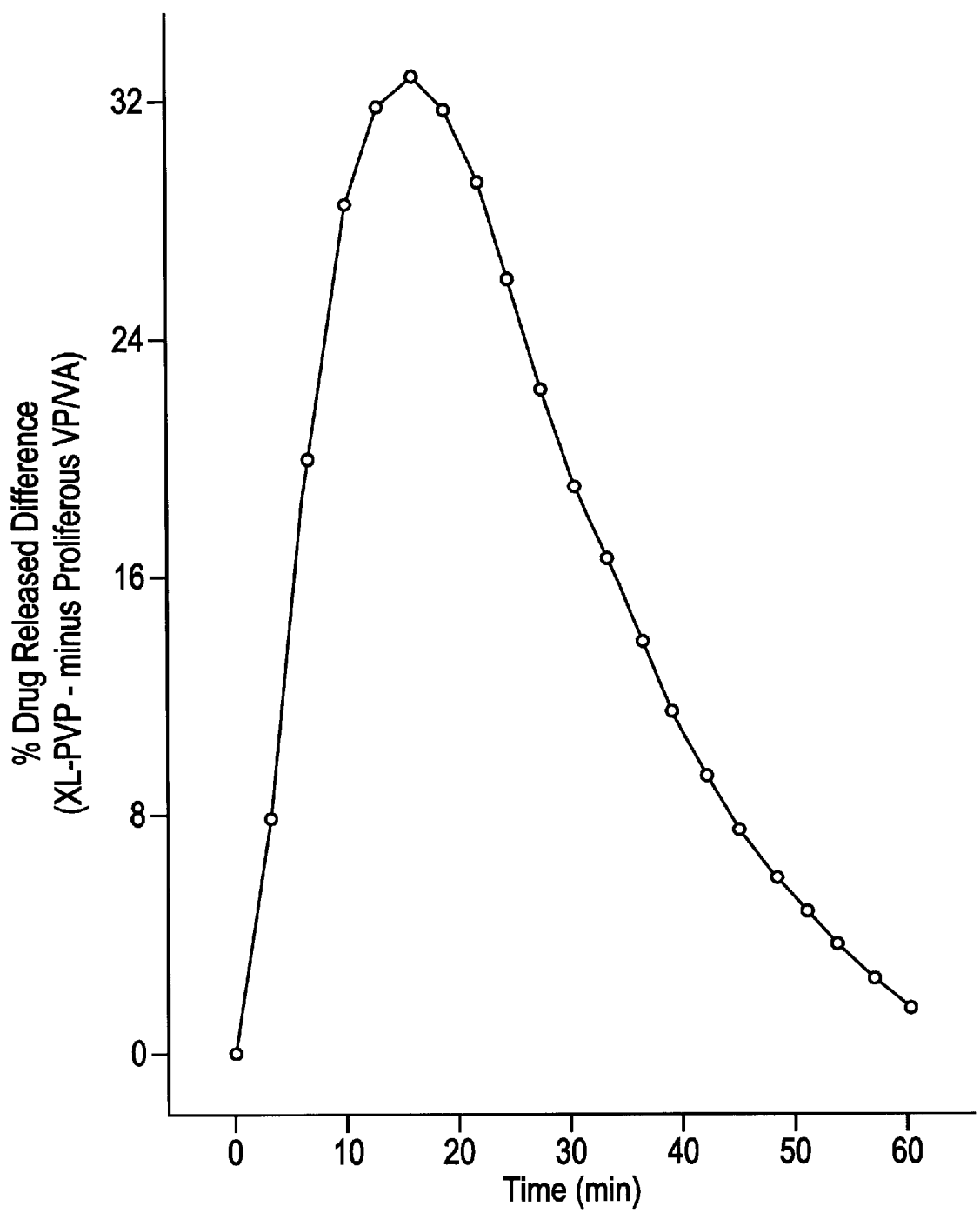
FIG. 2 is a graph of % Drug Release Difference (Polyplasdone® XL International Specialty Products Inc.— minus proliferous VP/VA).

Suitable pharmaceutical excipient formulations with theophylline as a model drug were prepared as shown in Table 2, with the proliferous-VP/VA copolymer of the invention (No. 3), Polyplasdone® XL (crosslinked PVP), (No. 2) and a Control (no polymer) (No. 1). FIGS. 1 and 2 show the dissolution performances of these formulations.

TABLE 2*

| Component | 1 | 2 | 3 |
|-----------|---|---|---|
| Theophylline | 50 | 50 | 50 |
| Copolymer VP/VA of Invention | — | — | 2 |
| Polyplasdone ® XL | — | 2 | — |
| Lactose (direct tableting) | 49 | 47 | 47 |
| Cab-O-Sil | 0.5 | 0.5 | 0.5 |
| Mg Stearate | 0.5 | 0.5 | 0.5 |

*The formulations were comparable in tablet weight, thickness, hardness, friability and compression force.

The experimental results shown in FIGS. 1 and 2 were generated with the following compositions.

| Crosslinked PVP (No. 2) | |
|---|---|
| 24.6562 g | VP |
| 0 g | VA |
| 0.4763 g | EVP |
| 6.25 g | $H_2O$ |

| (Proliferous-VP/VA) (No. 3) (79.4% by wt. VP/20.5% VA) | |
|---|---|
| 18.49 g | VP |
| 4.78 g | VA |
| 0.4763 g | EVP |
| 6.25 g | $H_2O$ |

FIG. 1 establishes that Polyplasdone® XL has a strong initial bursting effect and released 88% of the drug within 20 minutes, while the proliferous VP/VA copolymer had a more moderate drug dissolution occurs over time, with only 58% of the drug release in 20 minutes. Both samples released almost 100% of the drug in an hour. The Control, which does not contain a polymer disintegrant, released only 76% of the drug after an hour.

FIG. 2 shows the difference in % drug released during a one-hour period between Polyplasdone® XL and proliferous VP/VA copolymer. The greatest difference occurs between 6 and 42 minutes, which supports the observation in FIG. 1 that the Polyplasdone® XL sample exhibits a bursting effect while the proliferous VP/VA sample exhibits an eroding effect.

In addition to the dissolution results shown in FIGS. 1 and 2, it has been demonstrated that the disintegration time for the tablets of Table 2 containing the proliferous VP/VA disintegrant was 2.7 times slower than that of the Polyplasdone® XL disintegrant, and 2.4 times faster than the Control sample which contained no disintegrant.

While the invention has been described with particular reference to certain embodiments thereof, it will be understood that changes and modifications may be made which are within the skill of the art. Accordingly, it is intended to be bound only by the following claims, in which:

What is claimed is:

1. A pharmaceutical tablet which exhibits slow dissolution and disintegration of a drug therein comprising a proliferous copolymer of vinyl pyrrolidone and vinyl acetate.

2. A pharmaceutical tablet which exhibits slow dissolution and disintegration of a drug therein comprising the proliferous copolymer of claim 1.

3. A pharmaceutical tablet according to claim 2, in which said proliferous copolymer consists essentially of, by weight, about 60–85% VP, about 15–40% VA, and about 1–5% crosslinker.

4. A pharmaceutical tablet according to claim 3 in which said proliferous copolymer consists essentially of about 75–82% VP, about 18–25% VA and about 1.5–2.5% crosslinker.

5. A pharmaceutical tablet according to claim 3 wherein said crosslinker is ethylidene-vinyl pyrrolidone, divinyl imidazolidone, allyl methacrylate or N,N-methylene-bis-acrylamide.

6. A pharmaceutical tablet according to claim 2 in which said proliferous copolymer has a Tg of about 114–172° C.

7. A proliferous polymerization process for making a proliferous copolymer of vinylpyrrolidone (VP) and vinyl acetate (VA), which comprises providing a polymerization mixture of, by weight, 60–85% VP, 15–40% VA and about 1–5% crosslinker, at a temperature of about 100° C., heating until proliferous polymerization occurs, and then recovering the desired copolymer.

8. A product made by the process of claim 7.

* * * * *